United States Patent [19]

Nepper

[11] 4,008,962
[45] Feb. 22, 1977

[54] COLOR PRINTING METHOD
[75] Inventor: Robert F. Nepper, St. Paul, Minn.
[73] Assignee: Minnesota Mining and Manufacturing Company, St. Paul, Minn.
[22] Filed: May 23, 1975
[21] Appl. No.: 580,367

Related U.S. Application Data
[62] Division of Ser. No. 406,189, Oct. 15, 1973, Pat. No. 3,901,592.
[52] U.S. Cl. .............................. 355/77; 250/317; 250/569; 355/4; 355/32
[51] Int. Cl.² ...................................... G03B 27/32
[58] Field of Search ........................... 355/32–38, 355/77, 4; 250/317, 569

[56] References Cited
UNITED STATES PATENTS

| 3,752,577 | 8/1973 | Grossetete et al. | 355/34 X |
| 3,768,903 | 10/1973 | Steinberger et al. | 355/38 |
| 3,829,214 | 8/1974 | Zahn et al. | 355/38 X |
| 3,873,201 | 3/1975 | Amano | 355/38 X |

Primary Examiner—Richard A. Wintercorn
Attorney, Agent, or Firm—Alexander, Sell, Steldt & Delahunt

[57] ABSTRACT

Apparatus and method for making full color prints of a multicolor graphic original. The prints can be duplicates of the original or can be prints having colors for the various colors appearing in the original that have been synthesized to provide prints which are a "recoloring" of the original. The color data for synthesizing is stored in a permanent, machine readable form for later readout and use in controlling operation of the apparatus in order that the print from the original with synthesized colors can be easily reproduced without having to manually adjust controls for placing the necessary color data into the apparatus to obtain the desired "recolored" print.

2 Claims, 4 Drawing Figures

COLOR PRINTING METHOD

This is a division of application Ser. No. 406,189 filed Oct. 15, 1973, now U.S. Pat. No. 3,901,592 issued Aug. 26, 1975.

BACKGROUND OF THE INVENTION

1. Field of the Invention:

This invention relates to apparatus and method for the creation of various color prints based on a multicolor graphic original wherein manually adjusted controls are used to provide control data to provide such prints with such data being stored and automatically retrieved and applied to the apparatus for use in reproducing the prints.

2. Description of the Prior Art

U.S. Pat. No. 3,601,484 issued Aug. 24, 1971, has been embodied in commercially available apparatus to provide for the transfer of color material from a photosensitive intermediate to a receptive print sheet as a colored record of a colored original. The apparatus includes holding means for maintaining the original and the print sheet in mutually optically fixed positions with an exposure means provided for directing a light-pattern of the original toward the print sheet. Positioning means is also provided for placing the intermediate against the print sheet at the focus of the light pattern. After the intermediate has been exposed to the light pattern and with the intermediate in place, a developing means, which includes a source of electrically conductive radiation-absorptive toner powder with an applicator means, preferentially releases the tone powder at a high potential to the non-light struck areas of the photosensitive surface. The color material is provided on the intermediate adjacent to the printing sheet in a repeating sequence of adjacent color transfer coatings. Irradiating means, which may be a lamp, is directed to the intermediate inducing localized heating for transferring to the print sheet the color material for the color coating on the intermediate then positioned adjacent to the print sheet. The exposure means includes filters which are selectively placed in the light pattern to provide color separation of the light from the original. In the case of providing a true color print of the original, the color coating material presented on the intermediate must be the color complement to that of the filter selected. Accordingly, for true color print, the conventional primary colors may be used requiring a color transfer material producing a magenta image for use in conjunction with a green filter and similarly a yellow image material with a blue filter and a cyan image material with a red filter.

As is pointed out in the patent and implemented in the commercial apparatus available, colors other than those complementary to those of the filter and the color separation image may be supplied as desired. Accordingly, apparatus has been available which enables an operator to select the filter to be used with respect to the color coating presented or eliminate the transfer of a color material by deleting the development step for the color coatings by merely removing the high potential needed for releasing the toner powder to the unexposed areas. In addition, adjustment by the operator of the speed of the motor used to drive the irradiating means past the intermediate has been provided to control the degree to which the color material is transferred. The amount of color material transferred is reduced as the motor speed is increased since less heat will be generated for transfer of the color material.

The versatility of the apparatus as an artist's tool to provide synthesized colors in the print for the different colors in the original was realized and further changes were made in the commercially available apparatus to provide for overprint, that is, the print sheet is not removed after one series of color transfer coatings has been used with it, but is held in place for receiving colors from two or more sequences of color transfer coatings. Further, a set of speed controls for the motor driving the irradiating means, to provide a control setting for each of the three color coatings on the intermediate was made available with one such set of speed controls provided for each filter. The extent to which colors in a print for the various colors in the original could be synthesized was greatly enhanced with this arrangement. Having once created a print which is a "recoloring" of an original, it was desirable that provision be made so such prints could be readily produced in the future or perhaps on another machine at a different location. This was accomplished by having the operator make a record of the operating data input, i.e., various settings used for each set of three speed control settings. It was soon found that the resetting involved to provide the operating data input to the apparatus for repeating the created print from a given original was time consuming, subject to operator error in selecting the proper set of controls and subject to operator error in accurately setting the controls to the exact points that had been used. Further, it could be seen that some users might wish to have more than three sets of controls so a fourth or larger number of sequences of color transfer coatings might be used in effort to create a print which was some special "recoloring" of an original. This would mean adding still further sets of controls for each sequence of color transfer coatings operators might wish to use in arriving at a desired "recoloring" further increasing the task of re-entering the data with increased chances of erring when recording the color data and during subsequent use of the operating data when the "recoloring" was to be repeated.

SUMMARY OF THE INVENTION

This invention provides a solution to the need for continuing to add sets of controls to provide the versatility sought by users of the apparatus described with such solution actually reducing the number of sets of controls an operator must manipulate and providing a way in which the apparatus can repeat a created print which is a "recoloring" of an original with a minimum of operator effort while eliminating the possibility of any human error being introduced in providing the needed operating data to apparatus. The invention provides for apparatus structured in accordance with the teachings of U.S. Pat. No. 3,601,484 which is adapted for operation in accordance with control data manually selected by the operator or by control data stored in permanent, machine readable form with the apparatus adapted to readout such stored data when applied to the apparatus for control of the apparatus in accordance with the stored data.

The invention is embodied in an apparatus for transferring color material from a photosensitive intermediate containing the material to a receptive sheet with the degree to which the color material is transferred being determined by a variable operating parameter, the apparatus including a circuit portion for providing a control signal for establishing said parameter in accordance with an input signal; a manually settable source of input data; a stored data reader for providing input data in accordance with stored data presented to the reader; and interfacing circuitry connecting said manually settable source and said stored data reader to said circuit portion for providing said input signal in accordance with input data from either of said manually settable source and said data reader.

The invention provides for a method of making a color print from a multicolored original wherein a color present in the original is presented as the same or as a different color in the color print, the method including the steps of a. providing an apparatus which produces a color print from a multicolored original wherein a color present in the original is presented as the same or different color in the color print, said apparatus providing said color print in accordance with data signals provided by manually adjustable controls or in accordance with data signals obtained from a stored data media;

b. operating said apparatus using said manually adjustable controls to obtain a desired color print;

c. determining the data signals provided by use of the manually adjustable controls in step (b);

d. storing said data signals determined in step (c) in a machine readable stored data media for subsequent read out by said apparatus for use in operating said apparatus to provide the color print obtained in step (b).

BRIEF DESCRIPTION OF THE DRAWINGS

The invention will be better understood by reference to the following detailed description when considered in connection with the accompanying drawings in which like numerals designate like parts throughout the figures and wherein.

DESCRIPTION

In order that the invention may be readily understood, full consideration must first be given to the apparatus of the type disclosed in U.S. Pat. No. 3,601,484 reissued Aug. 24, 1971, including consideration of the various ways in which such apparatus has been used and controlled. It will serve also to better identify the problems arising from such use and control and provide an appreciation of their solution by this invention.

Figure 1:
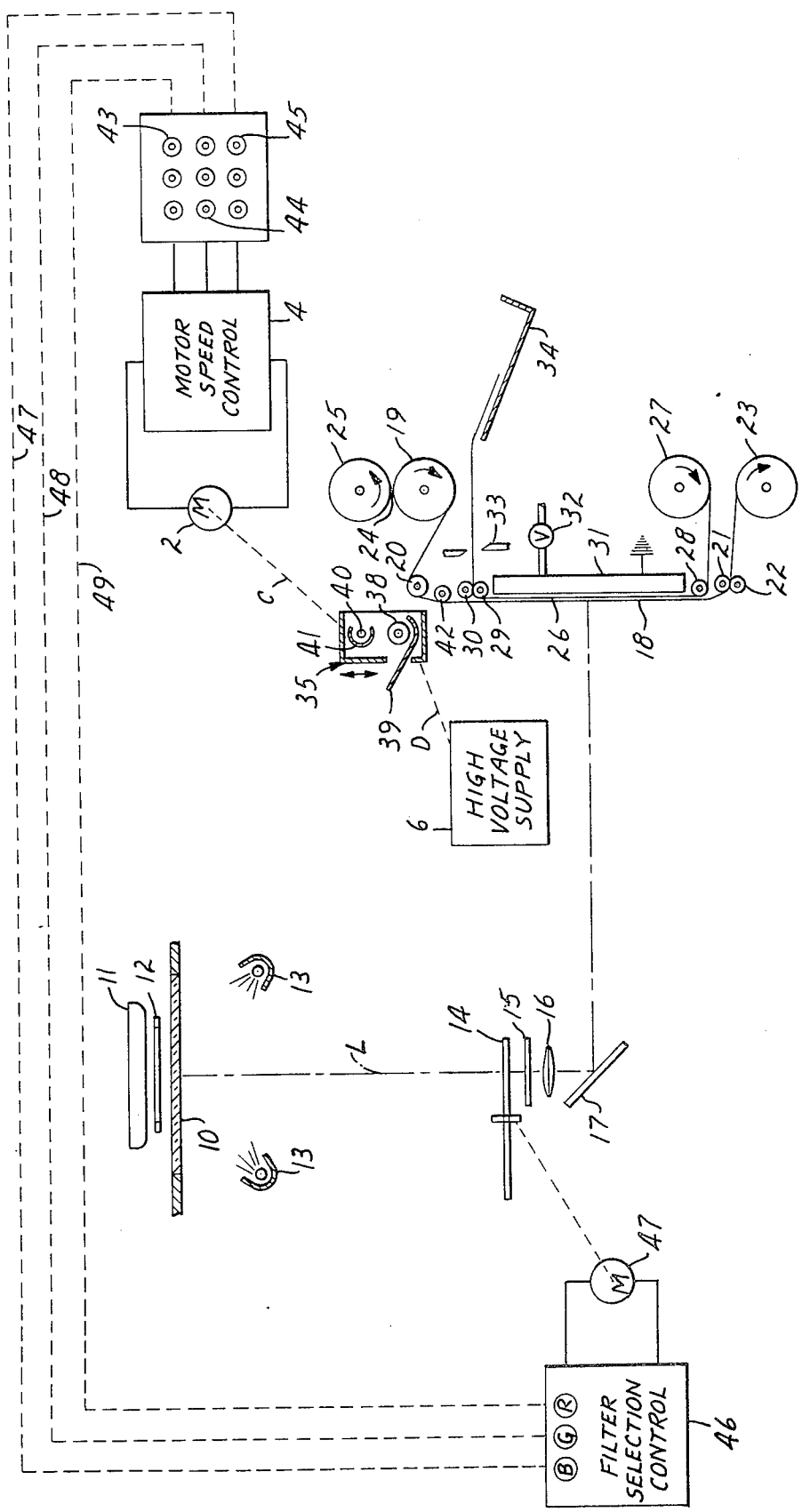
FIG. 1 is a showing of the basic apparatus that to which this invention is applied.

Such apparatus is shown in FIG. 1 and includes a transparent support 10 and pressure-cover 11 between which is placed the colored original 12, for example, a color illustration from a magazine, of which a full-color print or "recolored" print is desired. The light is supplied by sources 13 and is reflected from the original along the path indicated by the broken line L. Filter 14, shutter 15, lens 16 and mirror 17 are provided for controlling and directing the light beam. The beam comes into a focus at the photosensitive surface of intermediate sheet 18 obtained from supply roll 19 and tautly supported between idler roll 20 and pull drums 21, 22. The used intermediate is wound up on drum 23 with the (optional) liner 24, separating the convolutions of intermediate in the supply roll 19 being wound up on drum 25.

Print sheet 26 obtained from supply roll 27 is tautly supported between idler roll 28 and pull drums 29, 30 directly adjacent the intermediate 18 and against the porous or channeled face of a grounded vacuum platen 31, the platen being connected through a valve 32 to a vacuum pump. From the pull drums, the receptor sheet when advanced passes shears 33 which are then operated for removing completed prints which are deposited in the tray 34. A developing and printing station 35 is suitably supported on guides (not shown) for reciprocating movement along the face of the supported segment of the intermediate 18, direction of movement being as indicated by arrows in FIG. 1. The station 35 is moved by motor 2 at a speed determined by motor speed control 4. The cooperation between the motor 2 and station 35 is indicated by the dotted line C in FIG. 1. The station 35 includes a conductive powder applicator roll 38 and a toner powder supply trough 39 and a tubular high-intensity radiation source 40 within an open-sided semi-eliptical reflector 41.

Optional separator bar 42 is terminally supported for similar reciprocating movement across the face of the platen 31 between the intermediate and the print sheet.

The intermediate sheet 18 includes a thin supporting film having over one surface a continuous photosensitive layer for exposure to the light source 14 with an optional continuous conductive subcoat over the opposing surface on which a repeating sequence of three adjacent color transfer coatings are located. The print sheet 26 consists of a paper backing having a thin opaque surface coating.

The operation of the machine to obtain a full color print of the original 12 is as follows: With the intermediate 18 and print sheet 26 indexed to proper position and an original 12 in place, the vacuum pump (not shown) is actuated to pull a vacuum on the platen 31 and thereby press the intermediate and print sheet smoothly and firmly against each other and against the platen surface. The lamps 13 are energized and the shutter 15 open to provide the required exposure time. The light beam passes through a first color filter in the filter wheel 14 to provide a color separation and the resulting monocolor beam is focused and directed by the lens 16 and mirror 17, onto the photosensitive surface of the intermediate 18.

Following the exposure, the station 35 is passed over the exposed surface of the intermediate 18 and returned to position. During the forward movement, the developer roll 38 is extended to make contact with the intermediate and is maintained at a high electrical potential, about 1,000 volts above ground being typical. The high electrical potential is obtained from the high voltage source supply 6 and its cooperation with the developer roll 38 is indicated by the dotted line D in FIG. 1. Conductive radiation-absorptive toner powder from the trough 39 is thereby selectively deposited on the unexposed areas, the remainder being retained on the roll surface. A differentially electronically conductive pattern is created in the photosensitive surface of intermediate 18 by exposure to the light image. Contact of the sheet with the toner powder under the high potential applied to the developer roll results in retention of powder on the surface of the sheet. The lamp 40 is energized as the station 35 is passed over the intermediate 18 to provide brief exposure of the imaged surface. The radiant energies are absorbed at the powdered areas of the sheet and converted to heat. The resulting localized heating effect causes transfer of color material from the reverse surface of the intermediate 18 to the coated surface of the print sheet 26. During the reverse movement of station 35, the roll 38 is retracted and remains at ground potential.

The vacuum is next turned off and the separator bar 42 is caused to advance across the surface of the print sheet, thereby overcoming any slight temporary bonding between the two sheets. After completely separating the two, the bar is returned to a half-way point and somewhat removed from the print sheet thereby holding the intermediate out of contact with any portion of the print sheet. The pull drums 21, 22 are then activated to advance the intermediate and place the second color coating in position, whereupon the bar completes its return and the intermediate is placed in pressure contact with the print sheet against the platen 31. Meanwhile, the filter 14 has been turned to place the second color filter in the path of the image beam.

Exposure, development, transfer, separation, and reindexing steps are repeated for the second and any subsequent color separation desired. During the final sequence, and before the separator bar 42 is returned to its rest position, the print sheet 26 is advanced by pull drums 29 and 30 and a printed portion removed by shears 33 and deposited in the tray 34 leaving a fresh section of the print sheet in position adjacent the platen 31.

As has been indicated, it is necessary to use materials for the color transfer coatings on the intermediate which provide a color complementary to that of the filter and of the color separation image, in order to form a true color copy of the original since it is the non-light exposed areas of the intermediate which are made radiation-absorbtive with the color material transferred from the reverse surface of the intermediate at these areas. For a true color copy of the original, a color transfer material producing a magenta image in conjunction with a green filter and a yellow image material with a blue filter and a cyan image material with a red filter are used. White areas are reproduced unchanged; black areas of the original are reproduced by the combination of all three color materials.

Three control sets 43, 44 and 45, each having an operator adjustable control for each of the three color coatings were added to the apparatus as disclosed in U.S. Pat. No. 3,601,484. Each control in a set is a potentiometer which is varied to establish a voltage which determines the speed of the motor 2 for color coating associated with each control.

Adjustment by the operator of the speed of the motor 2 used to drive the irradiating means past the intermediate 18 provides for control of the degree to which the color transfer material is transferred. The amount of color transfer material that is transferred is reduced as the speed of motor 2 is increased since less heat is then generated for transfer of the color material. Thus, the controls on the left for control set 43 might be the control for establishing the speed of motor 2 when the yellow coating of the intermediate 18 is presented, the next control is set 43 for the magenta coating and the control on the right for the set 43 being for the cyan coating. A filter selector 46 was also added so any of three filters (blue, green, red) in the filter 14 could be selected. The controls were arranged further so each filter selected by means of a filter selection control 46 and filter positioning motor 47 was associated with a different one of the control sets 43, 44, 45 as indicated by dotted lines 47, 48 and 49. Thus, for example, selection of the blue filter meant the controls of control set 43, as adjusted by the operator, would be operative to selectively control the speed of the motor 2 for each of the color transfer coatings as they are presented, with the selection of the green filter establishing the control set 44 as the one controlling the speed of motor 2 for each color transfer coatings and the selection of the red filter establishing the control set 45 as the one controlling the speed of motor 2 for each color transfer coating. In addition, the controls were arranged so "overprint" could be selected, i.e., advancement of print sheet 26 is inhibited after a single sequence of color transfer coatings had been transferred. With "overprint" available plus the filter selection control 46 and the three control sets 43, 44 and 45, each filter could be used with a separate sequence of coat transfer coatings with the degree of transfer of each coating being controlled by the operator. This enabled the operator to use one or all three of the filters and with each filter used, select the degree of transfer for each color coating by use of the appropriate setting of the three control sets 43, 44 and 45 to provide a print of the original which would be a "recoloring" of the original as determined by the operator controlled inputs to the apparatus. Transfer of any one color transfer coating was eliminated by removing the high voltage from the developer roll 38 during the developing step for the color coating for which no transfer was to be made. Since it was desirable that the operator be able later on to repeat print which is a "recoloring" of an original at some future time, the settings for each control in the control sets 43, 44 and 45 had to be recorded with the original identified in some manner with the settings. This arrangement, it was seen, was subject to human error in reading of the recorded settings plus possible error in making the settings and limited the operator to the use of only three sequences of color coatings in arriving at a "recoloring" of the original since only three sets of controls for controlling the motor speed was provided.

The present invention provides for apparatus having greater flexibility than the apparatus described in connection with FIG. 1 in that a machine readable data storage media containing stored control data is used with the apparatus to control its operation with only a single set of manually settable data input controls being provided. The machine readable data storage media can take on many forms wherein the stored data media can, for example, be read out via optical, magnetic, pheumatic, electro-mechanical readers, etc. In the embodiment disclosed in FIG. 2, a tabulating card 50 is used as the data storage media which can be read by any number of commercially available electromechanical card readers 51.

Figure 2:
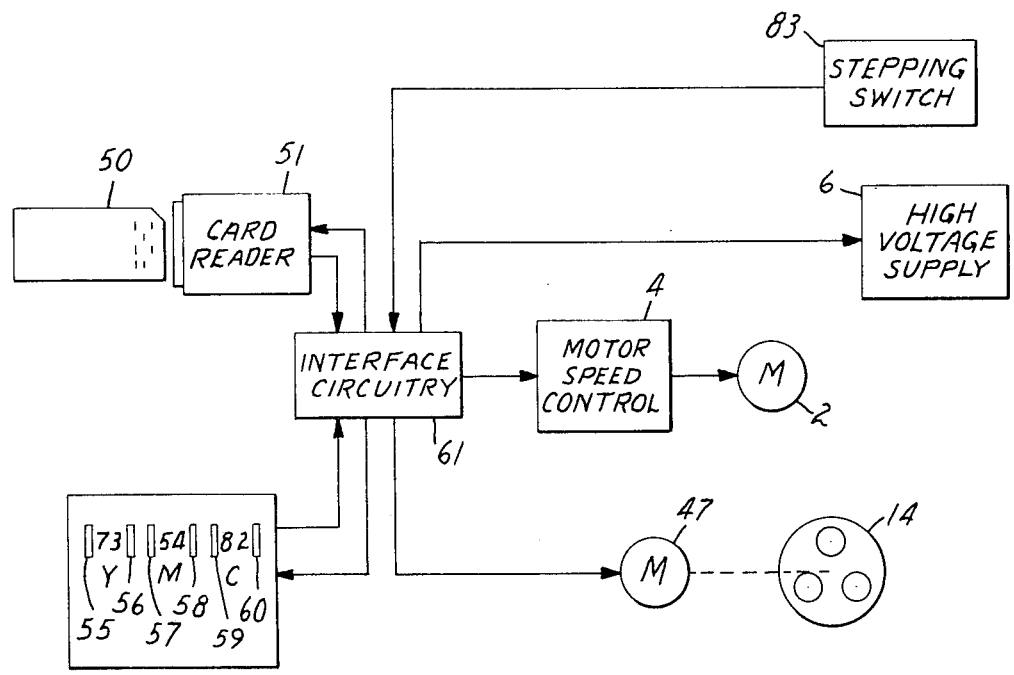
FIG. 2 is a block diagram illustrating one embodiment of the invention.
Figure 3:
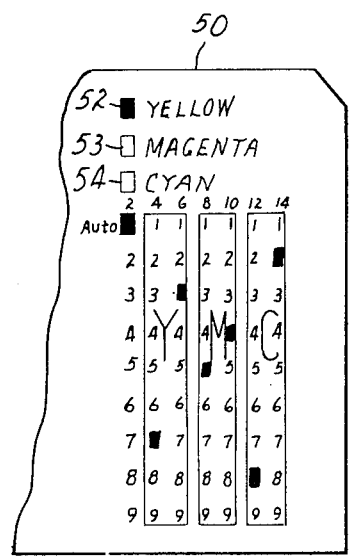
FIG. 3 is a partial showing of a tabulator card used in the embodiment of FIG. 2.

FIG. 2 discloses the controls required to adapt the apparatus as described for use with a tabulating card 50 on which selected control data is stored. FIG. 3 is a partial showing of a tabulating card 50 of a type commonly used with a card reader 51. Holes are provided in the columns and rows as required for storage of data. The card reader 51 is arranged to read holes presented at positions 1-9 of numbered columns, 4, 6, 8, 10, 12 and 14 and at the numbered column 2, row 1 position plus the three positions 52-54 above row 1 in column 2. A hole is shown presented at position 52 and is provided when it is desired that color material be transferred to the print sheet 26 where yellow appears in the original 12, with holes provided at positions 53 and 54 for transfer of color material where magenta and cyan, respectively, appear in the original 12. Only one of the three positions 52–54 will present a hole at any one time. Since a hole is shown at position 52, the card when inserted in the card reader 51 will provide a signal from the card reader which via the interface circuitry provides a signal for controlling motor 47 to move the blue filter of filter 14 into the optical path L (FIG. 1). Columns 4 and 6 are used to provide stored digital data for use in establishing the speed of motor 2 when yellow material is to be transferred and is indicative, therefore, of the amount of yellow material to be transferred from the intermediate 18 to the print sheet 26. Column 4 contains the positions for storing the most significant digit (MSD) while column 6 contains the positions for storing the least significant digit (LSD). Columns 8 and 10 are similarly used for storage of digital data used in establishing the speed of motor 2 when magenta material is to be transferred. Columns 12 and 14 store such information with respect to the transfer of cyan material. By way of example, the card 50 in FIG. 3 is shown with holes indicating the number 73 is to be used for the yellow material, 54 for the magenta material and 82 for the cyan material. Two additional tabulating cards are used to store control data for use in controlling the amount of color material to be transferred when holes 53 and 54 are punched.

The control circuitry of FIG. 2 includes manually operated decimal to BCD switches 55–60 which provide binary coded decimal (BCD) output signals corresponding to the visual decimal indications provided by each switch. This single set of switches provides distinct positions that can be selected by the operator and is used in place of the nine potentiometer type controls provided by the three control sets 43–45 shown in FIG. 1. The BCD output signals from switches 55 and 56, when applied via the interface circuitry 61 to the motor speed control 4, establish the speed of motor 2 thereby providing a control of the amount of yellow material that will be transferred to the print sheet 26 from the intermediate 18. The settings made by the operator for switches 57 and 58 provide signals, when applied in a similar fashion, that establish the amount of transfer of the magenta material, while switches 59 and 60 are set with respect to the amount of cyan material the operator would like to have transferred to the print sheet 26. Switches 55, 57, 59 provide the most significant digit (MSD) and switches 56, 58, 60 provide the least significant digit (LSD).

The interface circuitry 61 is shown connected to the static card reader 51 and provides scan signals to the static card reader to read out the motor speed control data stored in a card 50 presented to the card reader. The data stored in a card 50 determines whether the interface circuitry 61 is to provide a control signal to the motor speed control 4 in response to signals from the decimal to BCD switches 55–60 or from signals as read out from a card 50 by the card reader 51. Though the source of signals to be utilized by the interface circuitry 61 is determined from the data stored in card 50, signals to indicate which of the signals that are available from the selected signal source are to be utilized and when they are to be utilized must be applied to interface circuitry 61. Stepping switch 83 shown connected to interface circuitry 61 provides such signals. Stepping switch 83 is positioned so as to be operated by the separator bar 42 (FIG. 1) each time the separator bar 42 moves to its up position. The high voltage supply 6 is also shown connected to the interface circuitry 61. The high voltage supply is deleted or removed from the applicator roll 38 whenever there is to be no transfer of color transfer material from the intermediate 18 onto the print sheet 26.

Figure 4:
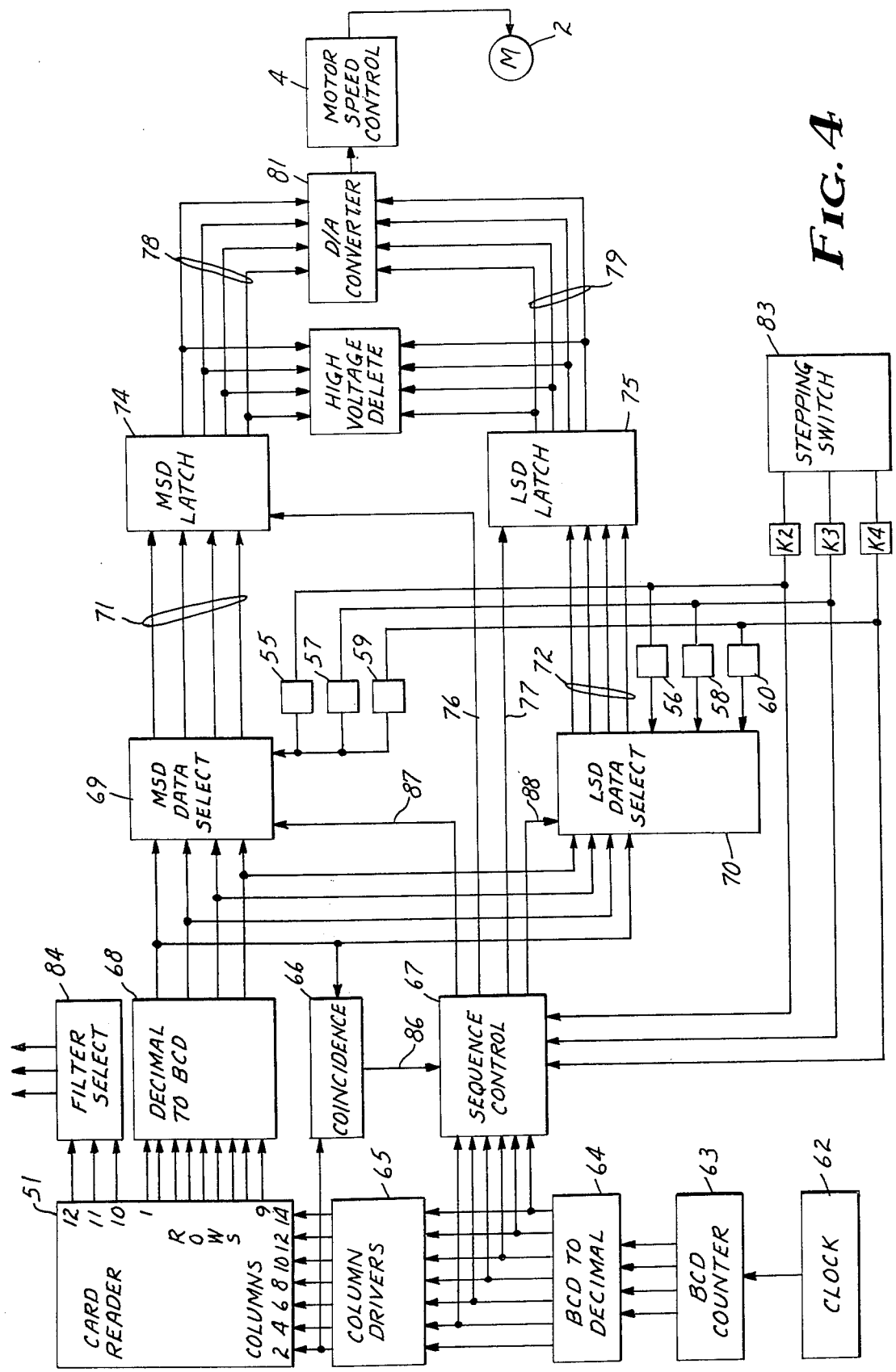
FIG. 4 is a detailed block diagram of a portion of the diagram of FIG. 2.

Details of the interface circuitry 61 are shown in FIG. 4, together with switches 55–60, card reader 51, motor speed control 4, motor 2, and stepping switch 83.

The interface circuitry 61 includes a clock 62 which provides square wave pulses at a suitable frequency, say 1KHz, to a binary coded decimal (BCD) counter 63 which in turn drives the BCD to decimal counter 64. Signals are presented in sequence at the seven outputs of converter 64 which connect to amplifiers in a column driver 65 for providing signals in sequence to the seven inputs to the card reader, one for each of the numbered columns 2, 4, 6, 8, 10, 12 and 14 of the card 50. In addition, the output of column driver 65 associated with reading out numbered column 2 of card 50 is applied to a coincidence circuit 66. The outputs from counter 64 corresponding to the remaining six outputs of column driver 65 are applied to the sequence circuit 67. The nine output lines from card reader 51 associated with the readout of the nine rows in card reader 51 are connected to a binary coded decimal (BCD) converter 68 which has four output lines on which signals are presented in accordance with the input signals received by the converter 68. Beginning with the upper output of circuit 68, the outputs have values of 1, 2, 4 and 8. Accordingly, if a signal appears on the input corresponding to row 9, a signal is presented on the upper and lower output lines of converter 68. The outputs from the converter 68 are applied to circuits 69 and 70 with the upper output also being connected to coincidence circuit 66.

The MSD outputs provided by decimal to BCD switches 55, 57, 59 are connected to MSD data select circuit 69, while the LSD outputs provided by decimal to BCD switches 56, 58, 60 are connected to LSD data select circuit 70. Each switch has four output lines which in FIG. 1 are represented by a single line from each switch.

Circuits 69 and 70 are selector circuits which connect either the output signals obtained from card reader 51 or the output signals available from the connected digital switches 55–60 to their respective output lines 71 and 72 in accordance with control signals received from sequence circuit 67 via lines 87 and 88, respectively. The four output lines 71 of MSD data select circuits 69 are connected to MSD latch circuit 74, while the four output lines 72 of LSD data select circuit 70 are connected to LSD latch circuit 75. Latch circuit 74 operates in response to a signal on line 76 from sequence circuit 67 to store the input signals then present on lines 71 and present them on the four output lines 78. Latch circuit 75 operates in a similar manner when a signal is presented on line 77 to store the input signals then present on lines 72 and present such signals on the four output lines 79.

The output lines 78 and 79 are connected to a high voltage delete circuit 80 which responds to the absence of signals on lines 78 and 79 to remove the high voltage provided from high voltage supply 6 to the powder applicator roll 38. The output lines 78 and 79 are also connected to a digital to analog (D to A) converter 81 which provides a voltage output in accordance with the signals presented to it. The voltage from the converter 81 is applied to a motor speed control 4 which responds to the voltage output from the converter 81 to cause the motor 2 to operate at a speed in accordance with the various output voltages that will be provided from the D to A converter 81.

The three upper output lines of card reader 51 connect with a filter select circuit 84 which is also a part of the interface circuitry 61. The upper output line is associated with position 52, the next output line with 53 and the third line with position 54. If one of the positions 52–54 presents a hole, a signal is supplied to filter select circuit 84 on the corresponding output line for the position. A signal is presented with respect to a hole at any of the positions 52–54 independent of any scanning signals applied to the card reader 51. The filter select circuit 84 responds to a signal to cause a relay (not shown) to operate which breaks all connections controlling the normal automatic sequencing of the filter 14. Three outputs are shown for the filter select circuit 84. One output presents a control signal to cause the blue filter of filter 14 to be positioned when the position 52 on card 50 presents a hole. A control signal at another output is for positioning the green filter of filter 14 in response to a signal produced by the sensing of a hole in card 50 at position 53. The red filter of filter 14 is presented when a control signal is presented on the third output line due to a hole sensed of position 54.

The interface circuitry also includes three relays K2, K3 and K4, which are controlled by stepping switch 83 with only one of the relays being energized at any given time. Relays K2, K3 and K4 are all connected to the sequence control 67 of the interface circuitry. As will be described, each relay when energized causes the sequence control to be conditioned to respond in a particular manner with respect to the signals received by the sequence control from the BCD to decimal converter 64 of the interface circuitry. Relay K2 is also connected to switches 55, 56 with relay K3 connected to switches 57, 58 and relay K4 connected to switches 59, 60. Switches 55–60 only provide BCD output signals when the relay to which they are connected is energized.

The operation of the apparatus will be described by first considering its operation when a tabulator card 50 is used which has data stored for providing input signals for determining the speed of motor 2 and selection of the filter to be present.

The color transfer coatings on the intermediate 18 are considered to be presented in repeating sequences of yellow material, magenta material and then cyan material. When a yellow transfer coating is in position, relay K2 is energized and relays K3 and K4 are de-energized.

Assuming the card 50 shown in FIG. 3 is being used, the hole at position 52 will be detected causing a signal to be presented to the filter select circuit 84 which is effective to cause the blue filter to be positioned in the optical path L of the apparatus. In response to operation of clock 62, a scan pulse signal from the column driver 65 is presented first to numbered column 2 of the card 51. Since a hole present at row 1, column 2 is sensed, a signal is presented on the row 1 output line of the reader 51 causing a signal to be presented at the upper output line of the decimal to BCD converter 68. This output line in addition to being connected to the selector circuits 69 and 70 is also connected to the coincidence circuit 66 to which the scan pulse from column driver 65 for column 2 of the reader 51 is also applied. Circuit 66 responds to the presence of the two input signals by presenting a signal to the sequence circuit 67 via path 86. The sequence circuit 67 responds to such a signal by presenting a signal via path 87 to the MSD selector circuit 69 which signal is effective to condition circuit 69 to respond only to BCD input signals received from the converter 68. In addition, a similar signal is presented by circuit 67 to LSD selector circuit 70 via path 88 making it effective to respond only to BCD input signals received from the converter 68.

When relay K2 is energized, the sequence circuit 67 is conditioned so only the pulse it receives from converter 64 when a scan pulse signal for reading numbered column 4 of card 50 is presented will be effective to cause an enabling signal for MSD latch circuit 74 to be presented on line 76. The sequence circuit 67 is further conditioned by K2 being energized so that an enabling signal for LSD latch circuit 75 is presented on line 77 only when the scan pulse signal for reading numbered column 6 of card 50 is presented to circuit 67.

With column 2 having been read, the next scan pulse signal presented to card reader 51 is for numbered column 4 to determine which, if any, MSD data has been stored. Referring to FIG. 3, it is seen that row 7 of column 4 presents a hole so a signal is presented to the decimal to BCD converter 68 which is converted to BCD output signals. Accordingly, the upper three output lines for converter 68 present signals to the MSD data select circuit 69 and LSD data select circuit 70. Since column 4 is being read, the scan pulse signal presented to the sequence circuit 67 will only provide MSD latch circuit 74 with an enabling signal causing it to store the signals presented per the output from converter 68. The stored signals are presented to the D to A converter 81 causing it to provide a voltage, for example, 7.0 volts d.c., to the motor speed control circuit 4.

The next scan pulse signal presented to card reader 51 is for numbered column 6 to determine which, if any, LSD data has been stored. It is seen that a hole is present in row 3 of column 6 of card 50 causing the signal presented to converter 68 for row 3 to be converted to a BCD signal so the upper two outputs of converter 68 present signals to the MSD and LSD data select circuits 69, 70 which are passed on to the MSD and LSD latching circuits 74, 75. Since the scan pulse signal is presented for reading column 6, sequence circuit 67 responds by providing an enabling signal only on line 77 to latch circuit 75 causing it to store the signals presented to it per the output from converter 68. The stored signals are presented to the D to A converter 81 causing it to provide a voltage, 0.3 volts d.c., which is added to the 7.0 volts d.c. derived from the MSD data signal so that 7.3 volts d.c. is presented at the output of D to A converter 81. Though scan pulse signals are presented in sequence to columns 8, 10, 12 and 14 with the full scan all columns being repeated, the data stored in latching circuits 74 and 75 remain unchanged since only the reading of columns 4 and 6 give rise to any enabling signals on lines 76 and 77 from the sequence control 67 due to relay K2 only being energized.

The speed at which motor 2 is operated is established by the voltage from converter 81. As has been indicated, the speed of motor 2 determines the rate at which the high intensity radiation source 40 is driven past the intermediate 18 which in turn determines the amount of color material (in this case, yellow) that is transferred to the print sheet 26. The amount transferred varies inversely with the speed of motor 2.

When the radiation source 40 completes its sweep pass the intermediate 18, limit switches (not shown) are operated and the radiation source 40 is returned to its starting point to wait for the next pass. When the separator bar 42 is returned following advancement of the intermediate 18 so the magenta color material is the next to be transferred, relay K2 is de-energized and K3 is energized in response to actuation of the stepping switch 83 by the bar 42.

Sequence circuit 67 is conditioned by the energization of relay K3 so that enabling signals are provided on lines 76 and 77 only when scanner pulse signals are presented to card reader 51 for reading numbered columns 8 and 10, respectively. The MSD and LSD data stored in columns 8 and 10 of the card 50 is presented for storage at the MSD and LSD latch circuits 74 and 75 as explained earlier with respect to columns 4 and 6 for the yellow operating mode. In this case the voltage signal obtained from the D to A converter 81 for establishing the speed of motor 2 when used for movement of the high intensity radiation source 40 past the intermediate 18 to transfer the magenta material to the print sheet 26 would be 5.4 volts d.c. Upon movement of the intermediate 18 so the cyan color material is the next material to be transferred, the separator bar 42 moves to its up position actuating the stepping switch 83 causing K3 to be de-energized and relay K4 to be energized so operation of the apparatus can begin for effecting transfer of the cyan material in accordance with another speed established for motor 2.

Sequence circuit 67 responds to the energization of relay K4 so that enabling signals for MSD and LSD and LSD latching circuits 74 and 75 are presented when scan pulses are presented for reading numbered columns 12 and 14, respectively. The MSD and LSD data stored in columns 12 and 14 of the card 50 is presented for storage at the MSD and LSD latching circuits 74 and 75 in the same manner as described for the yellow operating cycle and the magenta operating cycle. The cyan cycle is completed like the previous color material transfer cycles and at the completion thereof, relay K4 is de-energized and K2 re-energized in response to actuation of stepping switch 83 by bar 42 with the yellow material then positioned for the beginning of another sequence of color transfer coatings.

If it had been desirable to omit the transfer of a given color material, no holes would be presented in the MSD and LSD data columns of card 50 for that color material. In the process of reading such columns, no signals would appear on the output lines 78 and 79 from circuits 74 and 75. The absence of any input signals to the high voltage delete circuit 80 causes it to provide a signal that is effective to remove the high voltage 6 from the powder applicator roll 38 so no powder is transferred to the intermediate 18. The intermediate 18 will not be heated sufficiently when the high intensity source 40 is passed over it to transfer any of the color material.

Normally, the print sheet 26 would be advanced, severed by shears 33 and deposited in the tray 34 upon completion of the cyan cycle, but the presence of a card 50 being read by the card reader 51 is effective to operate a switch (not shown) which causes the print sheet advance action to be skipped.

Since position 52 of card 50 presented a hole, a blue filter was present for each color material transfer cycle causing the color material that was transferred to be placed where yellow content was present in the original. The degree of color transfer for each color material, as determined by the data stored in columns 4, 6, 8, 10, 12 and 14 as has been described, establishes the coloring on the print sheet 26 where yellow appeared in the original. If other cards 50 contained stored data relating to a print representing a "recoloring" of an original, these cards would be then read with each card determining the filter to be positioned in the optical path L and the MSD and LSD data stored in columns 4, 6, 8, 10, 12 and 14 determining the degree of color material transferred for a color transfer coating sequence. After all the cards relating to print representing a "recoloring" of an original are read, the operator actuates a switch (not shown) to cause the print sheet 26 action to take place whereby the print sheet is advanced, severed by shears 33 and deposited in tray 34.

An operator can readily experiment with various ones of the filters positioned and establish various operating speeds for motor 2 for each color material transferred to obtain a desired "recoloring" of an original by use of the decimal to BCD switches 55-60. Since control of the filter 14 is available via the use of tabulating cards 50, the operator uses a card 50 with the only readable hole provided in the card being the one he selects to be provided at one of the positions 52-54 to establish the filter to be positioned. Since a hole will not be present at row 1 of numbered column 2, signals will not be provided by the sequence control 67 via lines 87 and 88 to condition the MSD and LSD data select circuits 69 and 70 to accept signals from the decimal to BCD converter 68. The circuits 69 and 70 will instead receive the BCD signals provided in accordance with the settings made on switches 55-60 and the energization of the relays K2, K3 and K4 which will be passed on to the D to A converter 81 via the MSD and LSD latch circuits 74 and 75 since circuits 74 and 75 will receive signals on lines 76 and 77 from sequence control 67 per energization of relays K2, K3 and K4 as explained earlier. Accordingly, the BCD signals provided by switches 55 and 56 in accordance with the settings made by the operator are passed on to the D to A converter 81 when relay K2 is energized, i.e., when the yellow material on the intermediate 18 is presented for transfer to the print sheet 26, to determine the speed of motor 2 and therefore the degree of transfer of the yellow material. The settings made on switches 57 and 58 are similarly used to provide for BCD signals for use in determining the speed of motor 2 and are so used when relay K3 is energized, i.e., when the magenta material is presented for transfer, while the BCD signals available per settings made on switches 59 and 60 are so used with respect to the transfer of cyan material when relay K4 is energized.

Since the action for advancing the print sheet 26 is skipped by the presence of the card 50 in the card reader 51, the operator can, if he desires, use another card 50 to select another filter and reset the switches 55-60 to establish the degree of transfer of yellow, magenta and cyan material for another sequence of operation. This overprint operation can be followed, if desired, with another one or more overprint operations using a filter selected by the operator with switches 55–60 set by the operator.

Following any sequence of operations in which yellow, magenta and cyan material has been transferred, the operator may obtain a print by actuating the "print out" switch (not shown) which initiates the print sheet advance action wherein the print sheet 26 is advanced, the shears 33 are actuated and the print is deposited in tray 34.

Following such experimentation, the operator will obtain a print which he considers acceptable. The print, of course, dependent on the filters selected and the number of overprint operations, will be a print wherein all or some of the colors in original appear as different colors in the print. It may be desirable to reproduce such print at some future time. Knowing the various filters used and the settings for switches 55–60 associated with each filter, such data is stored using tabulating cards 50 with each of such cards having a hole provided at the row 1, numbered column 2 position. Should anyone wish to reproduce the print that was obtained, it is only necessary to place the original in the apparatus and use each card 50 associated with such print in the card reader 51 for controlling the operation of the apparatus. After the last card has been processed, the print out switch (not shown) is operated to obtain the print which will be identical to that had previously been obtained using the operator initiated settings for switches 55–60 with the various filters that had been selected by the operator.

The use of a data storage media such as the tabulating cards 50 to store the data relating to the various switch settings and the associated filters for a print eliminates the need for the operator to read the various settings that had been made and manually insert the settings on the switches 55–60, thereby saving time and removing any possibility of error on the part of the operator reading such data from another source and entering it on the proper ones of switches 55–60.

While the use of a machine readable data storage media with the basic apparatus of FIG. 1 in a manner compatible with the use of manually adjustable controls has been illustrated with respect to the development of a voltage signal for determining the speed of motor 2 which is directly related to the amount of color material that will be transferred from the intermediate 18 to the print sheet 26, it can be appreciated by those skilled in the art that the speed of motor 2 represents only one parameter involved in the transfer process which may be controlled in a similar manner via operator adjustable controls and the use of a machine readable storage media. For example, the degree of transfer of color material can be varied by controlling other parameters such as the time or the intensity of the light source 13 which determines the degree to which the photosensitive intermediate 18 is exposed by the light pattern obtained from the original or the transfer may be controlled by the level of the high voltage applied to the development roll 38. Another parameter that can be controlled, which is related to the degree of color material transfer, is the high intensity light source 40 which can be controlled, for example, by a variable iris positioned to control the amount of light that can pass to the intermediate 18, or by control of the position of the reflector 41 for lamp 40 or by control of the power supplied to the lamp 40. It is obvious also that one or more of such parameters could be varied at the same time to effect control of the degree to which the color material is transferred.

In light of the above teachings, other alternative arrangements and techniques embodying the invention will be suggested to those skilled in the art. The scope of protection afforded the invention is not intended to be limited to the disclosed embodiment, but is to be determined only in accordance with the appended claims.

What is claimed is:

1. A method for making a color print from a multicolored original wherein a color present in the original is presented as the same or as a different color in the color print, the method including the steps of
    a. providing an apparatus which produces a color print from a multicolored original wherein a color present in the original is presented as the same or different color in the color print, said apparatus providing said color print in accordance with control data provided by manually adjustable controls or in accordance with control data obtained from a stored data media;
    b. operating said apparatus using said manually adjustable controls to obtain a desired color print;
    c. determining the control data provided by use of the manually adjustable controls in step (b);
    d. storing said control data determined in step (c) in a stored data media which is machine readable for subsequent read out and use in operating said apparatus using the data stored in the stored data media provided by step (c) to provide a reprint of the color print obtained in step (b).

2. A method for making a color image from a multicolored original wherein a color present in the original is presented as the same or as a different color in the color image, the method including the steps of
    a. providing an apparatus which produces a color image from a multicolored original wherein a color present in the original is presented as the same or different color in the color image, said apparatus providing said color image in response to control data provided by manually adjustable controls or in response to stored control data obtained directly from a stored data media;
    b. operating said apparatus using said manually adjustable controls to obtain a desired color image;
    c. determining the control data provided by use of the manually adjustable controls in step (b);
    d. storing said control data determined in step (c) in a stored data media for subsequent automatic read out and use in operating said apparatus in accordance with the stored control data to again provide the color image obtained in step (b).

* * * * *